INVENTOR.
MAX FISHMAN

United States Patent Office 3,491,296
Patented Jan. 20, 1970

3,491,296
PRECISE PEAK VOLTAGE DETECTION OF EQUAL REPETITIVE PULSES BY DIMINISHING CHARGING OF A CAPACITOR
Max Fishman, Saratoga, Calif., assignor to the United States of America as represented by the United States Atomic Energy Commission
Filed Mar. 16, 1967, Ser. No. 624,670
Int. Cl. G01r *19/04;* H03k *5/00*
U.S. Cl. 324—103                                                6 Claims

ABSTRACT OF THE DISCLOSURE

The disclosure relates to detection of the peak voltage of a series of input pulses of a constant or slowly varying pulse amplitude. A regenerative circuit is responsive to the input pulses to charge a capacitor. The capacitor voltage is amplified by a DC amplifier to develop a DC output voltage which is applied to the regenerative circuit for comparison with successive input pulses. When the DC output voltage slightly exceeds the peak voltage regeneration ceases. Slow discharge of the capacitor results in a DC output voltage slightly lower than the peak voltage. This again causes regeneration. The average DC output voltage is maintained equal thereby to the peak voltage.

---

The invention disclosed herein was made under, or in, the course of Contract No. AT(04-3)-400 with the United States Atomic Energy Commission.

BACKGROUND OF THE INVENTION

This invention relates to peak voltage detection, and more particularly pertains to detection of the peak voltage of a series of pulses of a constant or slowly varying pulse amplitude.

It is well known that peak voltages may be detected by charging a capacitor to the peak voltage to be measured. The charge is applied to the capacitor by means of a diode gate and is used to drive a high-impedance input amplifier. The amplifier output voltage is then compared with a reference voltage to ascertain the peak voltage. Such circuits generally require a critical selection of components to maintain stability after calibration. Moreover, these circuits are sensitive to temperature variations and power supply fluctuations which will upset the calibration; the circuits therefore need thermal isolation and a carefully regulated power source. Furthermore, these circuits may require nulling, differential readings, and manual adjustments of switches or potentiometers for each voltage reading. In other known arrangements, the peak voltage ascertained by counting incremental voltage steps necessary to discharge a capacitor from a peak voltage. Examples of these prior art arrangements will be found in U.S. Patent Nos. 2,925,577, 2,929,993 and 2,946,013.

SUMMARY OF THE INVENTION

In the present invention, each incoming signal is compared with a DC output voltage developed by previous incoming signals of substantially the same pulse height. any voltage difference between the incoming signals and the DC output voltage is used to adjust the output voltage toward the peak voltage of the pulses. The average DC output voltage is maintained equal thereby to the peak voltage of the pulses and may be conveniently and directly measured with a conventional voltmeter. Any temperature variation, power supply fluctuation, or component instability will therefore be automatically compensated, i.e., the average DC output voltage will adjust to equal the input pulse peak voltage. Neither calibration nor manual adjustment of the circuit is required since the DC output voltage and peak voltage are automatically equalized.

It is an object of the invention to accurately measure peak voltages, including the peak voltage of low power pulses.

Another object is to accurately measure peak voltages in the presence of temperature variations, power supply voltage fluctuations and component instability.

Another object is to provide a stable peak voltage detector that automatically compensates for component instability, temperature variation and power supply voltage fluctuations.

Another object is to provide an improved peak voltage detector having a high input impedance and a low output impedance.

Other objects and advantageous features of the invention will be apparent in a description of a specific embodiment thereof, given by way of example only, to enable one skilled in the art to readily practice the invention, and described hereinafter with reference to the accompanying drawing.

DESCRIPTION OF AN EMBODIMENT

Figure 1:
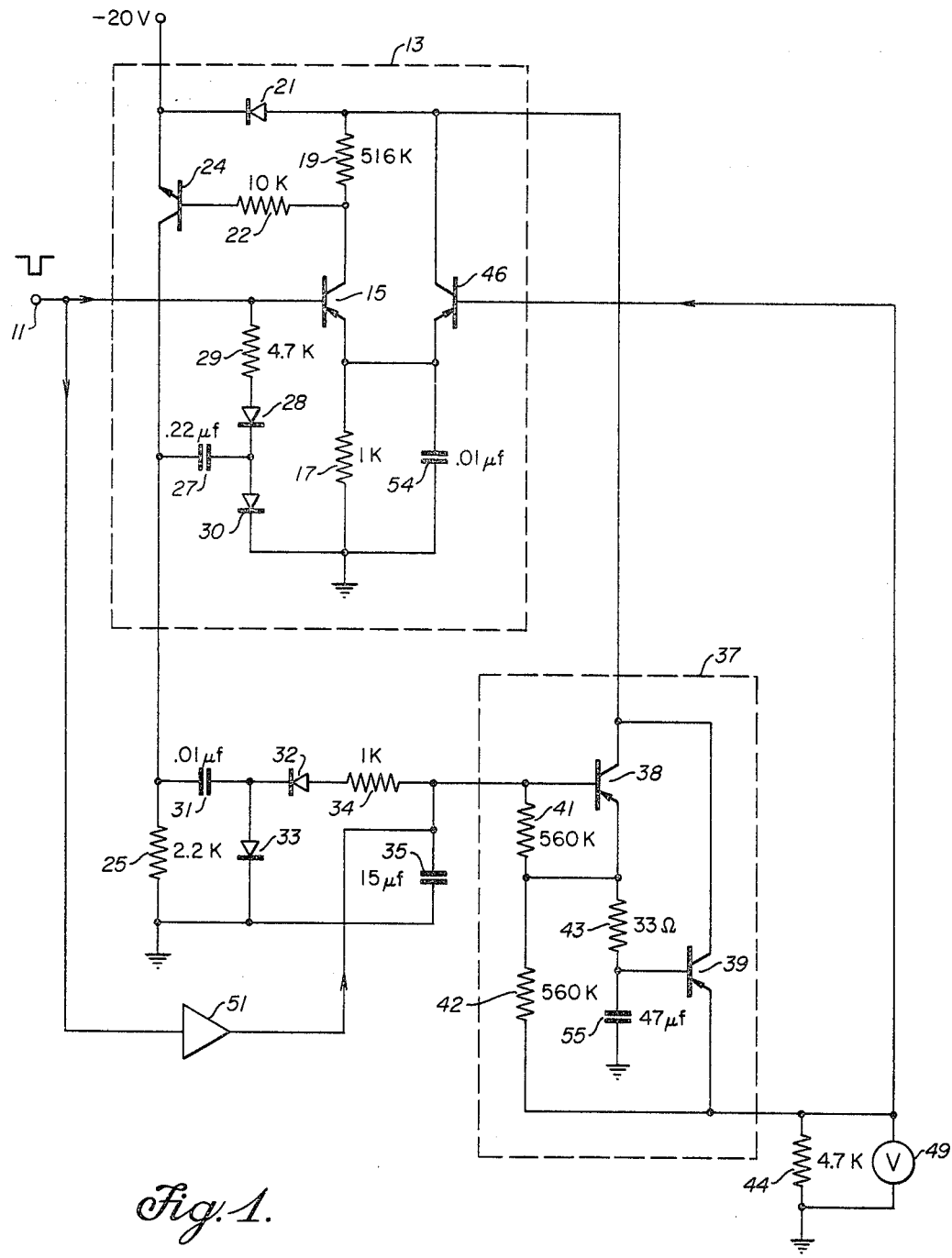
FIGURE 1 is a schematic diagram of a peak voltage detector according to the invention.

For a detailed description of an embodiment of the invention, reference is made to FIGURE 1 wherein a series of narrow negative input pulses of the same pulse height are applied to an input terminal 11 of an amplifying and stretching circuit 13. The circuit 13 includes a transistor 15, the base of which is connected to the terminal 11. Upon the application of a negative input pulse to the base of the transistor 15, the base and emitter become forward biased, causing the transistor to conduct from ground through a biasing resistor 17, a resistor 19 and a diode 21 to a negative power source. A positive going pulse is developed thereby at the collector of transistor 15 and is conducted through a resistor 22 to the base of transistor 24 for amplification. The emitter and base of transistor 24 become forward biased, causing the transistor to conduct from ground through a resistor 25 to the negative power source. A large negative pulse is developed thereby at the collector of transistor 24. This pulse is conducted through a capacitor 27, a diode 28, and a resistor 29 to the base of the transistor 15. This causes an increase in the forward bias between the base and emitter of transistor 15, driving the transistor to regeneratively conduct after the duration of the initial narrow pulse applied to terminal 11. A diode 30 is provided for DC restoration of capacitor 27 at the conclusion of regeneration of transistor 15.

Figure 2:
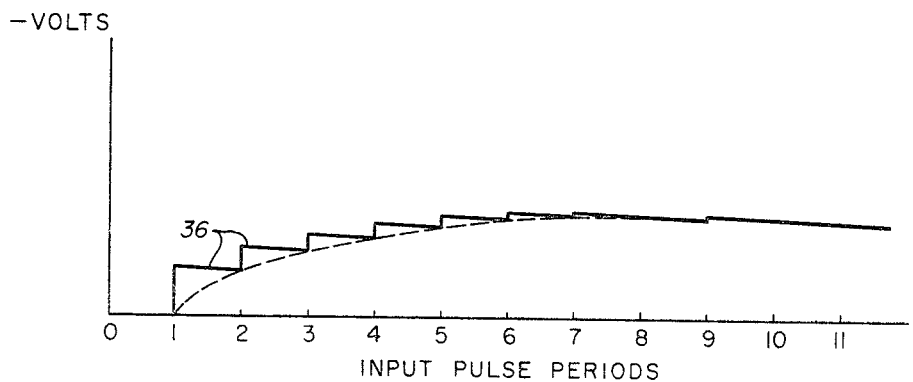
FIGURE 2 is a graph of the voltage across a storage capacitor in the circuit of FIGURE 1 illustrating initial charging of the capacitor by successive pulses.

The large negative pulse applied to capacitor 27 during regeneration is also applied as a negative charging voltage through a capacitor 31, diode 32, and resistor 34 to a holding capacitor 35. Successive input pulses applied to terminal 11 cause corresponding steps of voltage to be built up on capacitor 35 in an exponential manner. A curve of the voltage across capacitor 35 is illustrated in FIGURE 2. The curve is comprised of steps 36 which increase in a negative direction at an exponential rate as indicated by comparison with a hypothetical dotted curve representing a charge from a constant voltage source.

The values of capacitors 31 and 35 are chosen so that upon application thereacross of the negative charging voltage from transistor 24, a large negative increase is obtained across capacitor 31 while only a small negative increase is obtained across capacitor 35, i.e., capacitors 31 and 35 function as a voltage divider. This is desirable, as will be more fully discussed hereinafter, in order to attain a steady state voltage across capacitor 35 which varies only by very small voltage steps. A diode 33 is provided for DC restoration of capacitor 31 to prevent charges from accumulating thereon. This ensures that upon each successive pulse from transistor 24 a large fraction of the charging voltage is applied across capacitor 31 while a proportionately smaller portion is applied across capacitor 35. This results in successively smaller voltage step increases across capacitor 35 as indicated in FIGURE 2.

The voltage across capacitor 35 is applied to an amplifier 37 which comprises a cascaded paid of transistors 38 and 39 connected as emitter followers. The voltage on capacitor 35 is applied across resistors 41 and 42 equally to the bases of transistors 38 and 39, thereby initiating conduction and development of a DC output voltage across a resistor 44. A small resistor 43 is placed in series with transistor 38 to limit the current therethrough. The voltage across resistor 44 is applied to the base of a transistor 46, causing the transistor to conduct whenever the negative voltage applied to the base is equal or more negative than the base voltage of transistor 15. Thus, during interpulse periods, transistor 46 conducts at a level that is proportional to the negative voltage across resistor 44. Conduction of transistor 46 is from ground through biasing resistor 17 to the negative power source. During interpulse periods, the voltage across resistor 17 is dependent on the conduction of transistor 46 and is applied to the emitter of transistor 15. The forward bias between the emitter and base of transistor 15 is lowered thereby as the negative voltage level across capacitor 35, and hence resistor 44 rises. However, since transistor 15 is activated regeneratively each time it conducts, a large charging voltage will be developed at the collector of transistor 24 as long as conduction can be initiated through transistor 15. Successive charging voltage pulses will be substantially equal regardless of the forward bias between the emitter and base of transistor 15 due to the regenerative action. As a result, the voltage across capacitor 35 is built up in successive voltage steps until the negative voltage applied to the base of transistor 46 exceeds the peak voltage of negative input pulses applied to terminal 11 and the base of transistor 15. This will cause transistor 15 to become nonconductive. Since there is a slight discharge of capacitor 35 in driving amplifier 37, the voltage across capacitor 35 will relax toward zero potential, and after several pulse periods, will relax sufficiently to cause the negative voltage at the base of transistor 46 to be less than the peak voltage of the negative input pulses. The voltage across resistor 17 will therefore drop to the point that the emitter and base of transistor 15 become forward biased so that each input pulse again causes regenerative action of transistor 15 and charging of capacitor 35.

Figure 3:
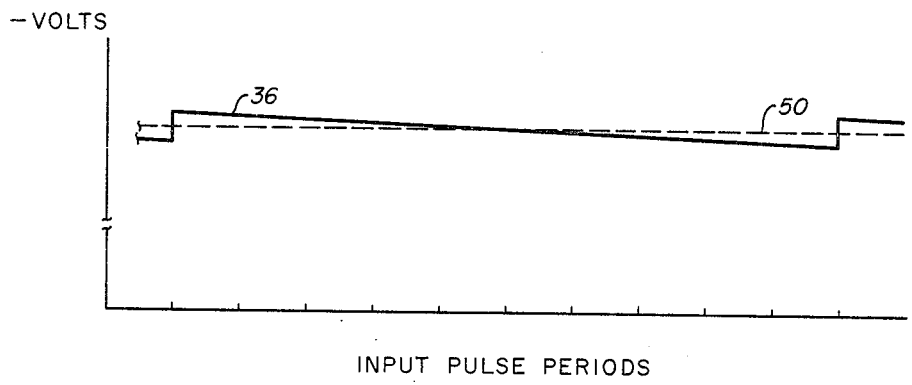
FIGURE 3 is a continuation of the graph of FIGURE 2 to an expanded scale for showing very slight voltage changes across the storage capacitor when it is charged to equilibrium.

This slight discharge and recharging after the capacitor is initially charged to equilibrium is represented in FIGURE 3, which may be considered a rightward extension of the curve of FIGURE 2 to an expanded vertical scale. The difference between the high and low points across capacitor 35 may be made purposely small by the choice of values for capacitors 31 and 35 and the placement of diode 33 as discussed hereinbefore. The difference may be made so small that it is undetectable by a conventional DC voltmeter 49 placed across the resistor 44. The voltage read by the voltmeter 49 will be an average value of the DC output voltage and is indicated by a dotted line 50.

Thus the output voltage across resistor 44 varies slightly above and below the peak value of the input pulses applied to terminal 11. As a result, the average DC output voltage across resistor 44 is substantially the same as the peak voltage of the input pulses and is available from a low impedance source which will not be loaded by the conventional DC voltmeter 49.

A change in the peak voltage of a series of pulses applied to terminal 11 will be detected by the voltmeter after several pulse periods. In the case of an increase in the peak voltage of the pulses, the capacitor 35 is charged to a higher level until the voltage across resistor 44 is equal to the peak voltage. If the peak voltage of the pulses applied to terminal 11 falls, there will be no regenerative charging until capacitor 35 discharges to a lower level through the amplifier circuit 37.

Similarly, any variation of the voltage across resistor 44 such as might result from power supply drift or fluctuation, temperature variation, or component instability is automatically compensated since any deviation of voltage across resistor 44 immediately drives transistor 15 to conduct to raise the voltage or prevents it from conducting to lower the voltage.

A peak voltage detector according to the invention was built with components arranged as shown in FIGURE 1 and having values as indicated therein, but omitting amplifier 51. The values shown for resistor 17, resistor 25 and capacitor 54 are approximate. Capacitors 54 and 55 were included as shown to filter out noise and facilitate triggering of their respective circuits. A series of input pulses having peaks from 0.8 to 5 volts and widths less than 2.5 microseconds were applied to terminal 11. The capacitor 35 was proportionately charged to −5 volts thereby. The voltage across resistor 44 was found to be accurate within 0.1% over a temperature range of 10° C.

The initial response of the circuit and its response to a peak voltage increase of the pulses applied to terminal 11 could be improved by connecting a very high-impedance DC amplifier 51 having a gain slightly less than one between terminal 11 and capacitor 35. This would supplement the charging of capacitor 35 and thereby raise the voltage across resistor 17 more quickly to the peak voltage, yet it would not affect the small voltage steps which maintain the desired peak voltage across capacitor 35.

It should be noted that the amplifier 13 shown in FIGURE 1 is essentially a differential amplifier adapted to respond regeneratively to the difference between voltages applied to the bases of transistors 15 and 46. However, other types of amplifiers including non-regenerative types, could be substituted for amplifier 13.

While an embodiment of the invention has been shown and described, further embodiments or combinations of those described herein will be apparent to those skilled in the art without departing from the spirit of the invention or from the scope of the appended claims.

The invention claimed is:
1. A detector usable for measurement of peak voltage for detecting the peak voltage of a series of electrical input pulses of the same amplitude, comprising
    (a) first means for amplifying said pulses;
    (b) second means responsive to said first means for developing a direct current voltage in a series of steps each corresponding to one of said input pulses, said second means including
        a first capacitor for storing pulse charges from said first means, an amplifier responsive to the charge on said capacitor for developing said direct current voltage, and an element in series with said first capacitor across said first means, said element being capacitive and effecting a voltage division of the amplified pulses thereacross greater that the voltage across said first capacitor, said element including third means for discharging said capacitive element and causing the charge stored on said first capacitor to be built up to a stablized level in successively smaller steps in response to successive input pulses; and (c) feedback means for applying said direct current voltage to said first means to terminate amplification of subsequent input pulses upon substantial equalization of the direct current voltage with the peak voltage of said input pulses.

2. A detector according to claim 1 wherein said first means includes a regenerative circuit responsive to each input pulse to charge said first capacitor, said circuit becoming unresponsive to the input pulses upon develment by said second means of a direct current voltage slightly greater than the peak voltage of the input pulses.

3. A detector according to claim 2, wherein said regenerative circuit includes an active conductance element with means for applying the input pulses to said element for initiating conduction of electric current therethrough, and wherein said active element is rendered nonconductive upon application thereto through said feedback means of said slightly greater direct current voltage.

4. A detector according to claim 1, wherein said voltage division element includes a second capacitor smaller than said first capacitor, and said third means includes a diode connected across said second capacitor for direct current restoration of said second capacitor during the period between pulses from said first means.

5. A detector according to claim 1, further including supplementary amplifying means having a gain less than one for applying the input pulses directly to said first capacitor for rapidly charging said first capacitor to a voltage level near the peak voltage of the input pulses.

6. A detector according to claim 1, wherein said first means is a differential amplifier comprised of:

(a) a first transistor having a base, emitter and collector, the base thereof being connected to said input terminal;

(b) a second transistor having a base, emitter and collector, the base thereof being connected to said feedback terminal, and (c) a common biasing resistor connected to the emitters of said first and second transistors, said second transistor being operable upon application to said feedback terminal of a direct current voltage slightly greater than said peak voltage to devolp a voltage across said resistor that renders said first transistor unresponsive to said input pulses.

References Cited

UNITED STATES PATENTS

| | | | |
|---|---|---|---|
| 2,468,687 | 4/1949 | Schmitt | 324—111 XR |
| 2,946,013 | 7/1960 | Deighton | 324—111 XR |
| 3,119,984 | 1/1964 | Brandt et al. | 324—111 XR |
| 3,264,573 | 8/1966 | Lefferts | 330—69 XR |

RUDOLPH V. ROLINEC, Primary Examiner

ERNEST F. KARLSEN, Assistant Examiner

U.S. Cl. X.R.

324—111; 328—151